(12) United States Patent
Wells

(10) Patent No.: US 8,438,150 B2
(45) Date of Patent: May 7, 2013

(54) SYSTEM AND METHOD FOR PRESENTING EVENTS

(76) Inventor: Matthew David Wells, Albuquerque, NM (US)

( * ) Notice: Subject to any disclaimer, the term of this patent is extended or adjusted under 35 U.S.C. 154(b) by 0 days.

(21) Appl. No.: 13/112,652

(22) Filed: May 20, 2011

(65) Prior Publication Data
US 2011/0289065 A1 Nov. 24, 2011

Related U.S. Application Data

(60) Provisional application No. 61/347,097, filed on May 21, 2010, provisional application No. 61/353,444, filed on Jun. 10, 2010.

(51) Int. Cl.
  G06F 7/00 (2006.01)
  G06F 17/30 (2006.01)
(52) U.S. Cl.
  USPC ............. 707/706; 707/707; 707/708; 706/12; 706/14
(58) Field of Classification Search ........................ None
  See application file for complete search history.

(56) References Cited

U.S. PATENT DOCUMENTS

| | | | |
|---|---|---|---|
| 7,010,530 B2 * | 3/2006 | Bartkowiak et al. | 1/1 |
| 7,587,381 B1 | 9/2009 | Remy et al. | |
| 2004/0059708 A1 | 3/2004 | Dean et al. | |
| 2009/0186700 A1 * | 7/2009 | Konkle | 463/42 |
| 2009/0319941 A1 | 12/2009 | Laansoo et al. | |
| 2010/0063723 A1 | 3/2010 | Lee | |
| 2010/0076994 A1 * | 3/2010 | Soroca et al. | 707/769 |
| 2010/0088126 A1 | 4/2010 | Iaia et al. | |

OTHER PUBLICATIONS

Apple News. "Happening Finds Nearby Events with Your iPhone." (online) published Apr. 4, 2010. Retrieved Aug. 24, 2011. Retrieved from the Internet<URL:http://www.iclarified.com/entry/index.php?enid=8646> 2 pages.
International Search Report and Written Opinion for International Application No. PCT/US11/37378 mailed Aug. 30, 2011. 7 pages.

* cited by examiner

Primary Examiner — Angelica Ruiz
(74) Attorney, Agent, or Firm — Wilmer Cutler Pickering Hale and Dorr LLP

(57) ABSTRACT

A system and method are disclosed for presenting attainable events in the form of an event widget on the client computer browser. This system and method provides for embedding an event widget onto a third party, or affiliate, website so that when the website is viewed by a computer end user, the widget displays a tailored list of events. The tailored list of events include events that may be filtered and ranked based on webmaster settings and refined by system users. The events may be data mined from the Internet, as well as entered by System Users. System Users that directly enter events have the option to sell tickets to those events, and the system will broker the sales commissions, as appropriate, to the entities that helped effect the sale, such as website owners and other System Users who provided event information in the form of audio or video presentations that were associated particular events.

24 Claims, 12 Drawing Sheets

FIG. 2

My Account

202 — Please login to view and update your account settings:
- Username: [    ]
- Password: [    ] [Validate]
- ... or create a new account.
- Desired Username: [    ]
- Password: [    ]
- Repeat Password: [    ] [Create New Account]

204 — Transactions [search transactions]

| Date ▼ | Transaction ▼ | Transactee ▼ | Amount ▼ | Action ▼ | Trans ID ▼ | Ticket ID ▼ | Event ▼ |
|---|---|---|---|---|---|---|---|
| May 30, 2010 @7:32p | sold ticket to | bjones | $10.00 | refund | 1234 | 5678 | Cirque du Soleil |
| May 30, 2010 @7:32p | paid fee to | xyz.com | -$1.00 | | 1235 | | |
| May 30, 2010 @7:32p | bought ticket from | tamara19 | $10.00 | cancel | 1287 | 5998 | Another Event Title |
| May 31, 2010 @8:01a | gave refund to | bjones | -$5.00 | | 1236 | 5678 | Cirque du Soleil |
| May 31, 2010 @11:52a | abc.mywebsite.com commission from | superstar99 | $1.00 | | 1237 | | Some Play |
| May 31, 2010 @11:52a | announcer commission from | andrea96 | $1.00 | | 1237 | | Some Play |
| May 31, 2010 @10:10a | got payout from | xyz.com | -$6.00 | | 1238 | | |
| | | | $0.00 | | | | |

206 — Change password
- Old Password: [    ]
- New Password: [    ]
- Repeat New Password: [    ] [Change Password]

208 — Configuration File for Websites You Control (show help)

```
site:       mythirdsite.com
title:      news about bugs
queries:    butterflies, moths, dragonflies, flies -airplane -delta -tickets,
            mosquitoes, horsflies, [1]mytag:bugs
location:   boise, idaho
location:   lexington, kentucky
location:   rhode island
location:   within 3 miles of 90210
showpics:   yes
```

210 — ☑ Always rank my events first
[Submit]

212 —
- Use *mypost* for events you posted.
- Use *allmytags* for events you tagged.
- Use *mytag:* "zzz" for events you tagged "zzz".
- Use *tag:* "zzz" for events others tagged "zzz".
- Use *postertag:* "zzz" for events the poster tagged "zzz".
- Use [N] before a query to rank thoese results above others.
- Use *hasaudio* for events that have audio content.
- Use *needsaudio* for events that need audio content.
- Put words in double quotes to search for the phrase.
- Preceed query word or phrase with a minus sign to exclude it.

To prove control of a website you must have a file in the root directory of the site named 340953012.txt.

Advanced Search

Enter your searches separated by commas: (examples)

302 —
```
search engines,
ask.com,
bing.com
```

304
- ☑ Save this advanced search to *myfaves*.
- ☑ Send *myfaves* email alerts to [bob@bob.com]
- ☑ Search the web
- ☑ Search Twitter
- ☑ Search Posts on xyz.com
- ☐ Search adult content 306
- Use *mypost* for events you posted.
- Use *allmytags* for events you tagged.
- Use *mytag:"zzz"* for events you tagged "zzz".
- Use *tag:"zzz"* for events others tagged "zzz".
- Use *postertag:"zzz"* for events the poster tagged "zzz".
- Use *[N]* before a query to rank thoese results above others.
- Use *hasaudio* for events that have audio content.
- Use *needsaudio* for events that need audio content.
- Put words in double quotes to search for the phrase.
- Preceed query word or phrase with a minus sign to exclude it.

308
- ☑ Anywhere
- ☐ In cities [Albuquerque, New Mexico: Boise, Ida]
  Example: Waverly, Ohio; Alta, Utah
  Use semicolon to separate multiple city/state pairs.
- ☐ In states [New Mexico]
  Use comma or semicolon to separate multiple states.
- ☐ In zipcodes [87109]
- ☐ In user's city
- ☐ In user's state
- ☐ In user's zip
- ☐ Within [20] miles of user 310
- ⦿ Anytime
- ○ From [January ▼] [1 ▼] to [January ▼] [1 ▼]

Favorite radio announcer qualities

312
| | |
|---|---|
| ☑ male (1032) | ☑ female (2566) |
| ☑ excessive profanity | ☐ kid-friendly |
| ☐ professional | ☐ amateurish |
| ☐ foreign accent | ☐ no accent |
| ☐ british accent | ☐ irish accent |
| ☐ scottish accent | ☑ southern accent |
| ☐ urban accent | ☐ boston accent |
| ☐ new york accent | ☐ scholarly |
| ☑ funny | ☐ monotone |
| ☐ low-pitched | ☐ med-pitched |
| ☐ high-pitched | ☐ fast talker |
| ☐ med talker | ☐ slow talker |
| ☐ loud spoken | ☐ avg spoken |
| ☑ soft spoken | ☐ robotic voice |

[Submit]

FIG. 7

701: x  Cirque du Soleil  x
May 31, 2010 8:45pm • Gulf of Mexico • by Valerie Smith • 137 views • 399 predicted • ★★ (15 votes)
map - buy tickets - tags - email this - tweet - edit - record audio presentation - Rate this event★★★★★

702:

| vol ■■■■■□□□□ | | Announcer | Presentation Rating | Your Rating |
|---|---|---|---|---|
| ▮▮ |----------■---------| playing | msimpson | ★★★ (3 votes) | ★★★★★ |
| ▶ |■-------------------| stopped | bjohnson | ★ (1 vote) | ★★★★★ |
| ▮▮ |■-------------------| stopped | robot | ★★ (2 votes) | ★★★★★ |
| ▮▮ |--------■-----------| recording | you | | delete recording |

NOTE: Recording is only permitted for human voices.

704: Cirque du Soleil is a dramatic mix of circus arts and street entertainment. Get behind the scenes looks at each show, pictures, and tour information. Cirque du Soleil weaves an aquatic tapestry of artistry, surrealism and theatrical romance in the timeless production, The international cast of world-class acrobats, synchronized swimmers, divers and characters perform in, on, and above water to create a breathtaking experience in a magnificent theatre reminiscent of a European opera house.

706:

708:

| May 31, 2010 8:45pm msimpson | This show was the greatest I've ever seen! |
|---|---|
| May 31, 2010 8:45pm pjones | Are you crazy msimpson? |

712: Enter comment here

714: You are posting this comment anonymously, otherwise, login:
[You are posting this comment as mwells (logout).]

Username [    ]
Password [    ] [Validate]
... or create a new account:
Desired Username [    ]
Password [    ]
Repeat Password [    ] [Create New Account]

To submit this comment, please answer the following captcha:
[captcha] [    ] [Submit Comment]

800

| x | User Tags | x |
|---|---|---|
| | for pjones | |
| ☐ | spammer (1) | |
| ☐ | helpful (2) | |
| ☐ | uses profanity | |
| ☐ | kid-friendly | |
| ☐ | honest | |
| ☐ | insightful | |
| ☐ | witty | |
| ☐ | funny | |
| ☐ | friendly | |
| ☐ | happy | |
| ☐ | educated | |
| ☐ | expert | |

| x | Event Tags | x |
|---|---|---|
| ☐ | inaccurate 🖃 | |
| ☐ | spam☢ | |
| ☐ | adult content ═ | |
| ☐ | buisness (2) | |
| ☐ | entertainment | |
| ☐ | sports | |
| ☑ | top events (23) | |
| ☑ | disasters (delete) | |
| ☐ | [new tag name] [Add] | |

| x | Announcer Tags | x |
|---|---|---|
| | for msimpson | |
| ☐ | male ♂ (13) | |
| ☐ | female ♀ | |
| ☐ | professional | |
| ☐ | amateurish | |
| ☐ | excessive profanity | |
| ☐ | kid-friendly | |
| ☐ | foreign accent (1) | |
| ☐ | british accent | |
| ☐ | scottish or irish accent | |
| ☐ | southern accent | |
| ☐ | urban accent | |
| ☐ | boston accent | |
| ☐ | new york accent | |
| ☐ | scholarly | |
| ☐ | funny ☺ | |
| ☐ | monotone | |
| ☐ | robotic voice | |
| ☐ | low-pitched voice | |
| ☐ | high-pitched voice | |
| ☑ | fast talker | |
| ☐ | slow talker | |
| ☐ | loud spoken | |
| ☐ | soft spoken (10) | |

Add Event

Just submit the event on the following url instead:

1202 — www.mystore.com/post3.html [Submit]

1204
- Title: Bob's Bar Happy Hour
- Author: Ben Robins
- Locations: 123 main street, Waverly, Ohio
- Dates: May 31, 2010 8:10 pm
- Custom Tags: beer, wine, good times
  A comma-separated list of categories and kephrases.

Predefined Tags:
- ☑ adult content  ☐ entertainment  ☐ top events  ☐ sports  ☐ science
- ☐ adult content  ☑ entertainment  ☐ top events  ☐ sports  ☐ science
- ☐ adult content  ☐ entertainment  ☑ top events  ☐ sports  ☐ science 1206
Event Description:
Come and have a cheap drink at Bob's Bar.

1208
Related Pictures:
[image] [image] [Upload Image]
delete   delete

1210
- ☑ Sell tickets for $10
- ☑ Sell up to [15] tickets. (5 tickets currently sold)
- ☑ tickets are refundable.
- ☐ By checking this box I certify I have read the Terms & Conditions.

1212
You are posting this comment anonymously, otherwise, login:
- Username: [        ]
- Password: [        ] [Validate]
- ... or create a new account:
- Desired Username: [        ]
- Password: [        ]
- Repeat Password: [        ] [Create New Account]

[captcha] To submit this comment, please answer the following captcha:
[        ] [Submit Event]

1300

| | Buy Tickets | |
|---|---|---|
| x | | x |

Event          Cirque du Soleil
Total Price    $10.00
Credit Card Type  [Visa ▼]
Credit Card Number [          ]
1302 { Credit Card Expiration [January▼] [2010▼]
Credit card Extension [123]
Name on Credit Card [John Doe]
Number of Tickets [1]

[Buy Tickets]
◇◇◇◇◆◇◇◇
Completing purchase, please wait...

1304 { Thank you!

You have Successfully purchased 1 ticket for $10 for *Cirque du Soleil*. Please visit your account to access your transactions.

FIG. 13

1402 — lady gaga tickets

GIGABLST — The Search Engine

Try your search on a *coal-based* search engine: google bing**

Results 1 to 10 of about 7,464,238 for lady gaga tickets

Giga Bits (more)
2011
concerts tour tickets
Quicken Loans Arena
concerts tickets Centre
Kanata
Arena at Gwinnett Ce

Lady GaGa Tickets. Compare Lady GaGa Tickets & Tour Dates
Lady GaGa Belfast tickets available, Lady GaGa tickets are still available .... Lady GaGa tickets avaiable for O2 Arena gigs, Lady GaGa tickets are ... Lady GaGa tickets available for O2 Arena shows this week. Lady GaGa tickets ...
www.tixdaq.com/lady-gaga-tickets/ - cached - More from this site 1404 — Lady Gaga Tickets - Lady Gaga Concert Tickets and Tour Dates, Official Live ...
Lady Gaga Tickets and Concert Dates, Show events near me: Search for events ... You're in the loop for Lady Gaga! We'll email you before tickets go on sale .... We currently do not have any tickets on-sale for Lady Gaga ... Click :Add to .....
www.livenation.com/artist/lady-gaga-tickets - cached - More from this site 1406 — Lady Gaga, Star Stadium, Houston TX, Jul 19th @ 7pm

Lady Gaga Tickets - Lady Gaga Concert Tickets - Lady Gaga Tour Dates
Vivid Seats has Lady Gaga concert tickets, Lady Gaga tour dates and seating ... Lady Gaga tickets for her new tour can be picked up today! ... Lady Gaga Dallas Tickets Lady Gaga Toronto Tickets Lady Gaga Huston Tickets ...
www.vividseats.com/concerts/lady-gaga-tickets.html - cached - More from this site

Lady Gaga Tickets - Lady Gaga Tour
Lady Gaga Tickets - From Folky to Freaky, Lady Gaga's fans know her real ... Lady Gaga Tickets - Lady Gaga Tour. Miami/S. Florida, FL. Change location ... Lady Gaga

SYSTEM AND METHOD FOR PRESENTING EVENTS

RELATED APPLICATIONS

This application claims the benefit under 35 U.S.C. §119 (e) of U.S. Provisional Patent Application Nos. 61/347,097 filed May 21, 2010 titled "System and Method for Presenting Events" and 61/353,444 filed Jun. 10, 2010 titled "System and Method for Presenting Events," both of which are herein incorporated by reference in its entirety.

FIELD OF INVENTION

The present invention relates to computer-based systems and methods for data mining, information retrieval, online events, event portals, and event-related search engines. More specifically, the present invention relates to widgets that are placed on third-party websites.

BACKGROUND OF THE INVENTION

A number of companies have become actively involved in the delivery of online news. These companies include, for example, Topix, Google News, Digg, Drudge Report, Technorati, and other primarily web-based companies. Further other traditional mainstream media sites have been actively involved in the delivery of online news, such as CNN, New York Times, Fox News, CBS News, etc. "Topix" is a registered trademark of Topix, Inc., "Goggle" is a registered trademark of Google, Inc., "Digg" is a registered trademark of "Digg Inc., "Technorati" is a registered trademark of Technorati, Inc., "CNN" is a registered trademark of Cable News Network, Inc., "New York Times" is a registered trademark of The New York Times Company, "Fox News" is a registered trademark of Twentieth Century Fox Film Corporation, and "CBS News" is a registered trademark of CBS Broadcasting Inc.

Recently, companies like Sphere.com and Google have permitted webmasters to insert widgets onto their web pages. For purposes of the present invention, a "widget" is a small standalone software application that can be installed (embedded) and executed within a web page by a computer end user.

Widgets that detect the content on the web page in which they are embedded and, based on that content, display either related news story links or advertisements are known. For example, Sphere.com's U.S. Pat. No. 7,587,381 describes a method for displaying news story links and Google's "Google AdSense" technology that is described in its U.S. Patent Application Pub. No. 2004/0059708 describes a method for displaying advertisement. However, conventional systems, like as those just described, fail to provide a focus on events. Events, unlike news or advertisements, are planned at a specified time and location. Events, in this context, can be anything from music concerts to more frequently recurring items, such as a local art museum's hours of operation.

Currently, ticketmaster.com displays a widget on third-party websites, such as the one shown in FIG. 1 at 100. FIG. 1 shows a computer-based display for ticketmaster.com for musical events for which tickets are on sale. The event artists are shown at 102 and the music categories are shown at 104. This same type of information will obtain by a System User clicking on one of the other icons at 106, namely "Sports," "Arts & Theater," or "Family." The display fails to provide additional information about a specific event based on a widget configured to data mine the host website to obtain such event information, permit ticket sales, and pay commissions.

Noting the conventional systems discussed above, there is a need for event-based widgets that provide greater flexibility for webmasters and System Users to configure the widgets to provide greater granularity for searching for and obtaining event information.

SUMMARY OF THE INVENTION

The present invention is a system and method of presenting attendable events in the form of an event widget on a client computer browser. More specifically, the present invention is directed to a system and method for embedding an event widget onto a third-party, or affiliate, website, so that when that website is viewed by a computer end user, hereinafter "System User," the widget displays a tailored list of events. Tailored events include events that may be filtered and ranked based on webmaster settings and refined by System Users. The events may be data mined from the Internet, as well as directly entered by System Users. System Users that directly enter events have the option to sell tickets to those events, and the system will broker the sale and pay commissions as appropriate to the entities that helped effect the sale.

The system and method of the present invention permit various criteria to be specified by webmasters to display events. This allows webmasters to display only events that they want to display, which differs from conventional widgets. For example, a webmaster that owns "karate.com" may configure the event widget to display only karate related events to visitors of "karate.com." Additionally, the system and method of the present invention permits the event widget to "auto-tune" by downloading web pages from the website in which it is embedded and then using the content on those web pages to specify the various criteria for configuring the event widget display.

According to a further feature of the present invention, a webmaster can input a website, for example, karate.com, and a predetermined set of search criteria, so that when a client computer browser visits that website, a list of events matching the search criteria that is sortable by date, distance, popularity, user rating, or relevancy are displayed in the event widget on the browser. The display of such results will continue as long as the website includes the appropriate code, such as the appropriate JavaScript code.

A yet further feature of the present invention is the payment of commissions. Thus, if a webmaster of a website helps a System User to purchase a ticket to an event, then the system central server, i.e., event server, may be configured to pay the webmaster a commission based on that referral. The present invention differs from prior art systems that permit payment of commissions for referrals because of the customization of widgets afforded webmasters according to the present invention. In this context, the present invention permits a webmaster to configure the events displayed on the widget by:

(1) only showing events that have related audio content,
(2) ranking events entered by the webmaster first,
(3) only showing events that have been tagged by the webmaster or other System User as a specific type,
(4) only showing events that were entered by the webmaster,
(5) only showing events data mined from a particular set of websites, or
(6) only showing events that match a predetermined set of keywords.

The present invention permits System User created audio or visual content to be associated with a particular event and the capability of those System Users to earn a commission any time that content is presented to a ticket purchaser. The entities entitled to receive these commissions are easily identified based on either the purchaser's cookies or IP address, which are available any time a data request is made. Eligibility for payments of these commissions usually occurs after an event takes place in case there is a cancellation or refund, but to that extent they are paid, these commissions are displayed in the webmaster's accounting table as "announcer commission from" on the webmaster's account window.

The present invention includes a "sort by distance" feature in the event widget that permits the System User to see the events closest to his/her geographic location. If the System User is using a device, such as an appropriated configured smart phone or smart device, e.g., a smart tablet device, they may upload his/her location in real-time to the event widget. The System User could be riding in a car with their smart device activated and watch the event widget listings and associated maps update in real-time. The System User, while riding in the car, also may push a predetermined button in the smart device and the event description in the event widget can be streamed to the System User as if the System User had his/her own hyperlocal event radio station.

The system and method of the present invention includes the capability to data mine the search results on a search results page for events. More specifically, the present invention includes a search engine that data mines events from each web page that is referenced in the list of search results either at query time, spider time, or some combination thereof. The data mined events are then formatted and presented on the search results page in a special event-related format. For example, if a System User searches for "Lady Gaga Tickets," one of the first results might be from "ticketmaster.com" and the search engine would data mine event information, such as "July 30$^{th}$ 7 pm $25 @ Big Star Stadium," from that web page, and then, if configured to do so, present this information near the search results. As such, the System User would have event-specific information that would allow him/her to more quickly decide if that is a page they want to visit.

In addition to displaying event records, the present invention can be used to apply various ranking and filtering methods to other types of records, such as jobs, people, items for sale, etc. For example, people might be rankable by age or experience, jobs could be sortable by geographic proximity to the user, and items for sale could be ranked by price or a consumer rating.

The present invention will be described in greater detail in the remainder of the specification referring to the drawings.

BRIEF DESCRIPTION OF THE DRAWINGS

FIG. 2 shows a representative screen display for a webmaster "My Account" interface.

FIG. 3 shows a representative screen display for an "Advanced Search" interface that permits a System User to customize a search setting.

FIG. 7 shows a representative screen display showing the details of an event which a System User will view when he/she clicks on the event "Cirque du Soleil" in FIG. 6.

FIGS. 8 through 10 show examples of interfaces for assigning tags that can be applied by System Users to events or announcers for filtering purposes.

FIG. 12 shows a representative screen display for an "Add Event" interface that permits System Users to manually add his/her own events to the event database.

FIG. 13 shows a representative screen display for a System User "Buy Tickets" interface that permits System Users to buy tickets.

FIG. 14 shows a representative screen display of search results that have data mined for event information.

DETAILED DESCRIPTION OF THE INVENTION

Figure 1:
FIG. 1 shows a prior art screen display for a ticketmaster.com widget.

The present invention is a computer-implemented system and method for presenting content, including, but not limited to, attendable events, to computer-based System Users. More specifically, the present invention provides a system and method for presenting multi-media event information through third-party websites, and providing the capability to sell tickets and pay out commissions based on those sales. The presentations provided to System Users according to the present invention may be viewed or experienced using variety of replay devices, including, but not limited to, a radio, tablet-type device, television, computer, smart phone or other multimedia device. For purposes of the present invention, an "event" shall be interpreted as any type of data record.

The present invention will involve the interaction of a webmaster that creates the event widget, third-party web page owners in which the event widget is embedded, and the System Users that visit the websites on which the event widget is embedded. The description of the present invention will include viewing it from the perspective of each of these entities.

Accordingly to the present invention, to create the event widget, the webmaster will visit a central website, which for convenience and purpose of explanation only is "events.com." This website includes a central server and the tools for the creation of event widgets by webmasters, and processing of tailored searches configured by webmasters for the display of events in event widgets on the System User client computer browser. The events.com website processes information from System Users to enhance their experience.

The events.com website permits System Users to upload audio and video presentations that may be added to, or associated with, events. Further, the events.com website will process and pay commissions based on ticket sales associated with events for entities that helped effect the sales.

Again referring to the events.com website, in order for the webmaster to create an event widget, he/she must first create an account. When the account is created, events.com will assign the webmaster a unique identifier ("UID") and provide that webmaster with certain JavaScript code containing the UID. The webmaster will then install this JavaScript into its website. The UID proves that this particular webmaster controls the particular website. More specifically, this provides a link between the webmaster account on events.com and the webmaster's website. In creating an event widget in this way using the webmaster account on events.com, it permits the webmaster to receive commissions. The webmaster may also prove ownership of a website by inserting the UID in any files on the webmaster website that events.com can download and verify.

FIG. 2, generally at 200, shows a representative screen display for a "My Account" interface that may be used by the webmaster or System User. At 202, the webmaster or System User enters username and password information or information for creating a new or accessing a pre-existing account. This will allow access to the account to view and update account settings. At 204, it shows transactions associated with the account. At 206, the webmaster or System User can enter information for changing the account password. At 208, configuration information about websites the webmaster controls is entered and displayed. At 210, a check box is provided for causing the events owned by a webmaster to always be ranked first when displayed in a widget. And at 211, additional accounts controls are displayed.

Once the webmaster installs the JavaScript in his/her website, the JavaScript will create an event widget on the website when viewed by a JavaScript enabled browser. Using either the event widget or the tools on events.com, the webmaster can configure the event widget to only display events that meet predetermined criteria. As such, the webmaster can customize the default settings for what will be seen by visitors that visit the website in which the event widget is embedded. Customizing the events to be displayed on the event widget may be based on, but not limited to, whether the event:

(1) has related audio content
(2) was directly entered by the webmaster
(3) has been assigned particular tags
(4) has been assigned particular tags by particular users
(5) was data mined from a given list of websites
(6) matches particular keywords.

All of the Advanced Search options available to System Users in FIG. 3 are available for the webmaster in the configuration settings at 208 in FIG. 2.

Referring to FIG. 3, the Advanced Search interface is shown at 300. This interface is accessed by a System User by clicking on a link on the event widget. It allows the System User to perform advanced searches of events. FIG. 3 at 302 shows the queries that events displayed in the event widget must match. In this case, "search engines," or "bing.com," or "ask.com," must be present in the description of an event in order for the event to be displayed in the search results. At 304, it shows controls for processing searches including saving the advanced search, sending the email alerts, searching the web and social media and other search locations. At 306, there are additional controls for searching. At 308 the advanced search interface provides geographic controls for searching. At 310, timing controls for searching are provided. And at 312, radio announcer quality preferences for searching are provided.

To the extent a System User wants to record an audio presentation for an event for playback in a radio-style setting, but the System User is not sure which events the audio presentation should be associated, the event widget permits the System User to search for events that have no associated audio content, and then rank those events by popularity. This will identify the events that would most benefit from the audio content based on the popularity results. This will present the opportunity to the System User to produce audio content for that event and maximize the commission on any resulting ticket sales.

FIG. 3 provides the means by which a System User can add audio to an event on the event widget. If a search is conducted based on the signal query "needsaudio" at 306, then the events on the list on the widget will indicate, for example, the most popular websites in an event even without audio associated with them. The System User may add audio according to FIG. 7, which will be discussed in detail subsequently.

Frequently, webmasters may desire to have their own events to be ranked above all other events. Referring again to FIG. 2, the webmaster may check the checkbox at 210 that says "always rank my events first" to cause the widget to always list the webmaster's events first.

The webmaster has the compatibility to restrict the events displayed on the event widget to those that have been assigned particular tags. For example, the webmaster might restrict the event widget to only displaying events that have been tagged "martial arts" by any System User. As seen in FIG. 2 at 208, the webmaster can configure the event widget on "mythirdsite.com" to show events that have been tagged by System Users as "bugs," because webmaster's website is a news site about the study of insects. In this way, the webmaster can manually search for events and tag them for inclusion in the event widget on mythirdsite.com.

The event widget according to the present invention also permits the webmaster to restrict the events displayed on the widget to only events data mined from a particular set of websites. This provides another method by which the webmaster can control the topic or focus the event widget, as will be described subsequently.

The webmaster has the capability to enter search terms that events must match in order to be included in the event widget. These terms must match words or other meta information contained in the event titles or description. For example, if a webmaster enters "books," then any event that matches "books" would be included in the event widget. Further, the event widget would include any event that contains "book" or other related words.

Again referring to FIG. 2, from a technical perspective, when a typical System User visits a website, such as mythirdsite.com, a website controlled by a particular webmaster, the event widget JavaScript is executed on the System User computer upon download of the requested web page. Execution of the JavaScript causes the transmission of the UID embedded in the JavaScript to events.com. Alternatively, events.com is aware a request is coming from a website visited by a System User for which events.com already has verified ownership by prior receipt of the UID. The central server at events.com will use the UID to look up the default search parameters set by the webmaster for that website. Next, the server will transmit these search parameters to the event search engine at events.com to generate the matching events. The matching events are then returned to the JavaScript code on the System User client computer and displayed in the event widget on the client computer browser. The UID embodiment will now be described in greater detail referring to FIG. 4.

Figure 4:
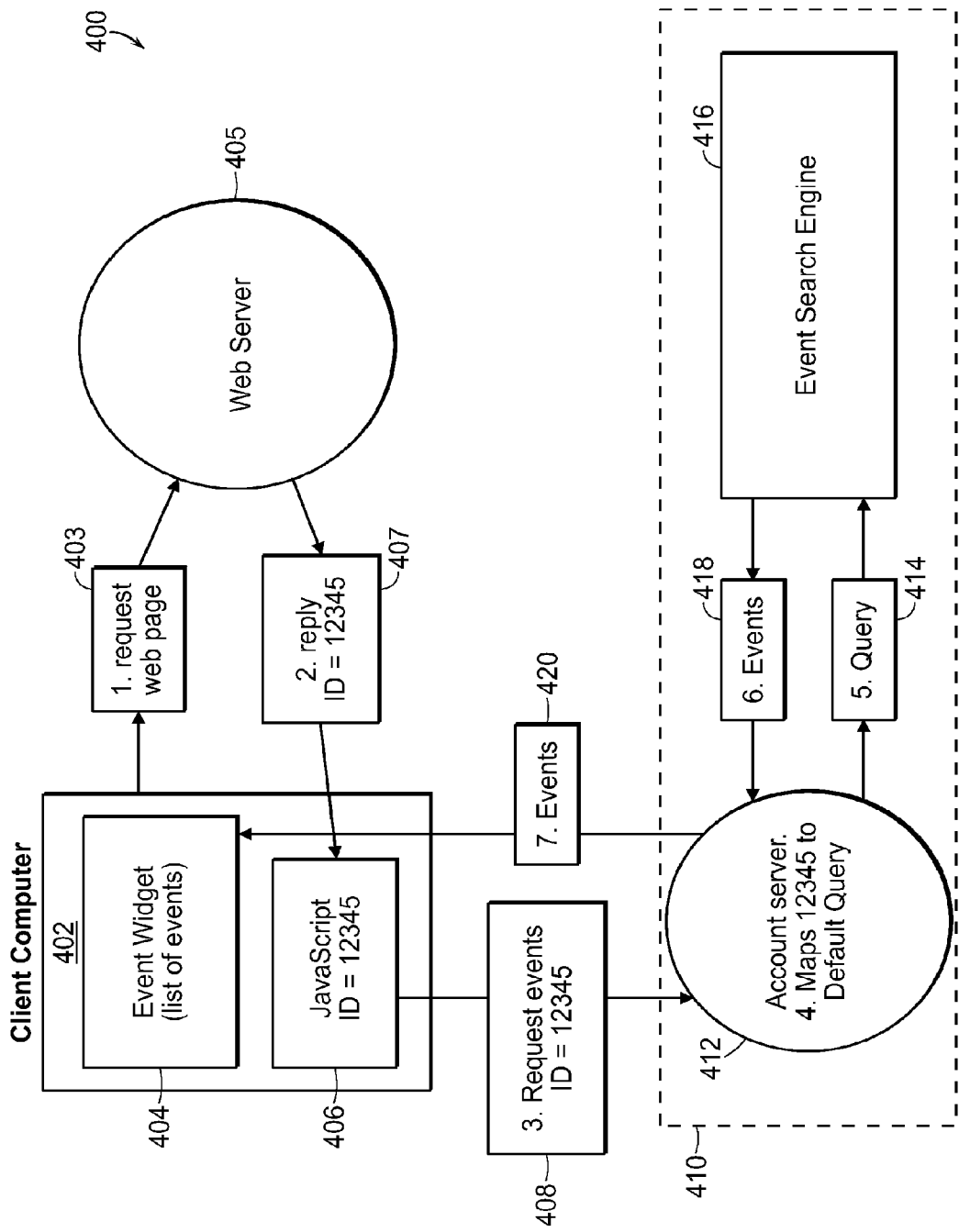
FIG. 4 shows a flow diagram for generation of an event widget display and events thereon based on the unique identifier embodiment of the present invention.

FIG. 4, generally at 400, shows a flow diagram for event widgets being displayed, for example, on a System User client computer according to the UID embodiment. According to FIG. 4, when a System User sends web page request 401 to visit the "mythirdsite.com," to web server 405, the web server will provide reply 407 that includes the web page and the webmaster's UID. Upon receipt of the web page, client computer 402 loads event widget JavaScript 406 and executes it.

The execution of JavaScript 406 will cause UID=12345 embedded in JavaScript 406 to be sent as "Request Event" 408 to events.com 410. In the alternative, the UID could be the URL of the requested web page 403, in full or part, and that could be used by the events.com account server 412 to look up the default search settings for that event widget. In either case, once the UID or its equivalent is received by the events.com account server 412, it will map the UID or its equivalent to default search parameters set by the webmaster. The events.com account server will transmit the default search parameters to events search engine 416 in the form of Query 414. Event search engine 416 includes an events database to which events may be added by a web spider, System User, or webmaster. Event search engine 416 will determine the matching events based on Query 414 and return these results as Events 418 to events.com account server 412. The matching events 420 are sent to JavaScript 406 on client computer 402 where they are then displayed on event widget 404 on the client computer browser. Furthermore, any transaction, such as a ticket purchase, originating from a particular widget, may use the widget UID or its equivalent when storing such transactions in the account server 412. This will be used for payment of commissions.

It is understood that events.com account server 412 may be of more than one server. This server can include an event central system server, a system accounting server, system ticket server, and system submission server. In such a situation, the events central system server, which can include a database, would be the overall server to which the other servers connect. The system accounting server, which can include a database, would be for associating a particular webmaster and his/her set of search parameters. The system submission server, which can include a database, would be for receiving audio or video content from System Users to associate with events. The system ticket server, which can include a database would be used by System Users to sell tickets and calculate commissions that are to be paid to webmasters and audio or video presenters.

The system and method of the present invention also permits the webmaster to auto-tune the event widget. According to the auto-tune embodiment, the webmaster can install the event widget on his/her website without the need of a UID. Once the webmaster has installed the JavaScript representing the event widget into his/her web page, the web page, when loaded on a System User client computer browser, will execute the JavaScript on the client computer. The JavaScript will send the URL of the web page, or other type of content to which it is associated, to the central server of events.com which downloads that web page (or other content), and determines the default search parameters based on web page content, such as keywords or topics. The default search parameters are used to conduct an event search, and the resulting list of events is then transmitted back to the JavaScript which displays the received events in the event widget. If the control server has recently downloaded the web page and the web page has not changed since that time, then the central server can skip the download step and quickly transmit the list of events to the System User client computer. The auto-tune embodiment will now be described in detail referring to FIG. 5.

Figure 5:
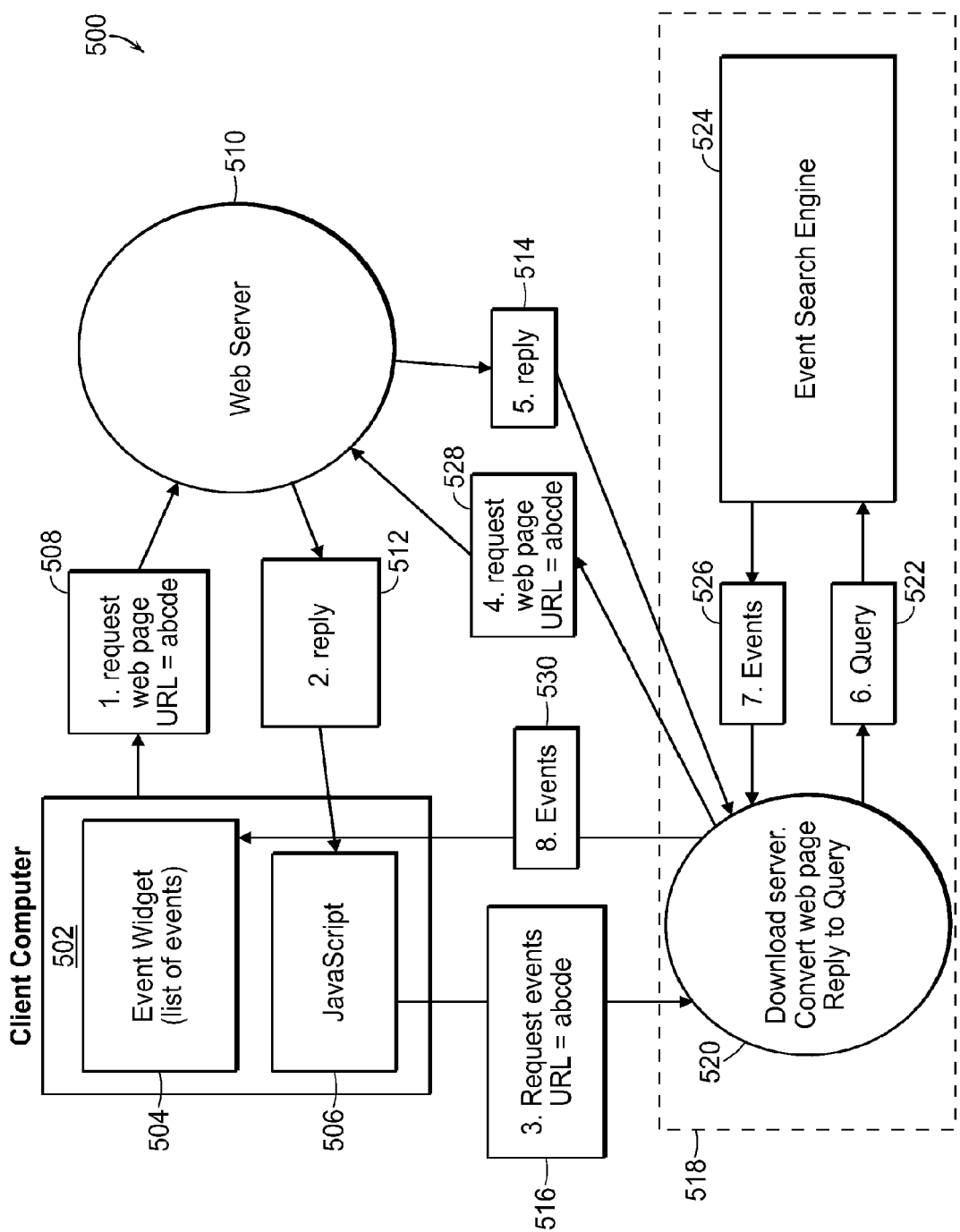
FIG. 5 shows a flow diagram for generation of an event widget display and events thereon based on the auto-tune embodiment of the present invention.

FIG. 5, generally at 500, shows a flow diagram for event widgets being displayed, for example, on a System User client computer according to the auto-tune embodiment. In this embodiment, the webmaster installs the event widget on its website without a UID. Once the webmaster has installed the JavaScript representing events widget, and web page request 508 is sent to web server 510, the web server will send a reply 512 that includes the web page including its URL. When the JavaScript 506 is executed, the URL is transmitted as "Request Events" 516 to events.com 518. Download server 520 of events.com 518 sends "Request web page" 528 to web server 510 to download the web page at the URL. The web page based on the URL is downloaded as reply 514 to download server 520. The download server will determine the default search parameters based on the web page contents, such as key words, topics, etc. The default parameters are used to form Query 522 for searching with event search engine 524. Event search engine 524 includes therein an events database to which events may be added by a web spider, System User, or webmaster. The search results based in the default search parameters are Events 526 that are sent to download server 520. These results are transmitted by download server 520 to JavaScript 506 as Events 530. JavaScript 506 will cause the events to be displayed on an event widget 504 on the System User browser of client computer 502.

It is understood that events.com download server 520 may be of more than one server. This server can include an event central system server, a system accounting server, system ticket server, and system submission server. In such a situation, the events central system server, which can include a database, would be the overall server to which the other servers connect. The system accounting server, which can include a database, would be for associating a particular webmaster and his/her set of search parameters. The system submission server, which can include a database, would be for receiving audio or video content from system users to associate with events. The system ticket server, which can include a database, would be used by System Users to sell tickets and calculate commissions that are to be paid to webmasters and audio or video presenters.

In both the UID embodiment and the auto-tune embodiment, the event search is performed on the event search engine using the default search parameters set by the webmaster and conventional web searching queries. However, different from conventional search methods, the present invention has the capability to sort the events by at least (1) the distance from the user;
(2) the date of the event;
(3) the event relevancy; and
(4) the event popularity.

With respect to popularity, events may use sorting granularity based on (1) the number of many web pages that refer to a specific event;
(2) how many pages refer to the event's venue; and
(3) the popularity of the web sites of such web pages.

System User's approximate geographic location can be inferred by their IP address. This location approximation, or even a user-entered zip code, may be used to rank the events by their closeness to the user. These and other ranking methods can be activated by controls incorporated within the widget to deliver a highly relevant user experience. This will be discussed in greater detail with regard to FIG. 11. The default ranking criterion is preferably by date but other criterion may be used and still be within the scope of the present invention.

Another aspect of the present invention is that it incorporates crowdsourcing for creating audio and video representations for each event description. These audio or video presentations can be created by anyone for any event and uploaded into the system's multimedia database, for example, using standard flash or HTML 5 procedures. Using a web camera and a microphone to record a presentation, a System User can stream the video and audio feed to the events.com central server, which stores the stream into files associated with a particular event. So, when a System User selects the "play" button on the event widget, the audio or video recording for each event in the list of events is transmitted to the System User for listening or viewing. In cases where an event has no such recording compatibility, a speech synthesizer can be used to add audio content. Such multimedia presentations can be tagged and ranked by System Users so that the good ones will be recognized and given priority when multiple presentations exist for the same event, as will be discussed with respect to FIGS. 8-10.

System Users also can set preferences based on the kind of presentations they want to receive. The system of the present invention upon receiving these preferences will endeavor, as best but as possible, to transmit to the System User presentations meeting those preferences when given a choice of multiple presentations for a particular event.

Figure 6:
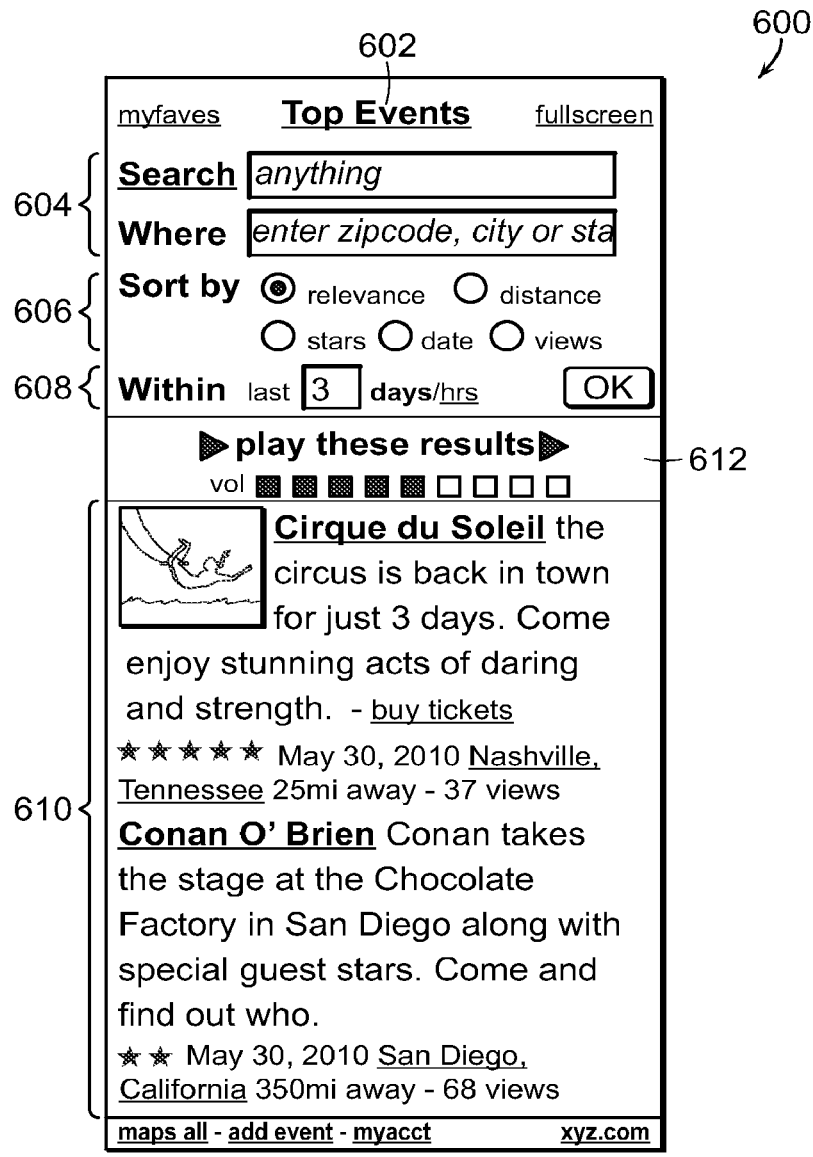
FIG. 6 shows a representative event widget displaying a list of events according to the present invention.

Referring to FIG. 6, generally at 600, an event widget is shown that can be placed on a third-party website. This event widget will be generated when the appropriate web page is downloaded by a website visitor. In the widget at 602, the System User's search preference is shown as "Top Events." At 604, the search terms and System User location are entered and displayed. System User sorting criteria are shown at 606, and timing criteria are shown at 608. Search results are shown at 610. Further, the event widget includes a "play" icon 612 for playing audio that has been associated with selected events.

The System User has the capability to set tags for association with events. These tags are shown on the interfaces at FIGS. 8-10. The tags at FIG. 8 at 800 are for the System User to tag other System Users, possibly for reporting violations of the terms of service, or for ranking and filtering comments entered by System Users. It is within the scope of the present invention that the "User Tags" in FIG. 8 at 800 may be presented to the System User when that System User clicks on the name of another System User and may be added by clicking on the name of another System User.

The tags at FIG. 9 at 900 are for the System User to help classify events. By clicking on an event, these tags are presented to the System User, along with the ability for that System User to add custom tags of his/her own. These tags can then be used by the tagged event to satisfy search queries entered by any System User. For instance, even though an event does not have the word "sports" in it, if it is tagged as "sports" by a System user, then it could be part of the returned events in response to an event search for "sports."

The tags at FIG. 10 at 1000 are for the System User to tag announcer audio presentations. These tags are accessed by clicking on the particular announcer in 702 of FIG. 7, and then applying the appropriate tag. Some examples of tags that describe what a System User might want to indicate regarding the ability or characteristics of an announcer include having a "British accent," or "loud spoken," or "female," or "professional." Again referring to FIG. 3, the preferred set of announcer tags are listed at 312.

FIG. 7, generally at 700, shows a window that appears when a user clicks on an event, such as a "Cirque du Soleil" that is shown at 617 in FIG. 6. At 701, information about the event relating views and voting is shown. 701 also permits the System User to generate a map associated with the event location, buy tickets for events, set tags (See FIG. 8-10), connect to social media, record audio presentations, and rate events. At 702, crowdsourced audio presentations related to the events may be accessed for listening. At 704, a written description relating to the event is provided. Photos relating to the event are shown at 706. At 708, written comments by System Users relating to an event are displayed. An input window is provided at 712 for System Users to provide his/her comments about the event. At 714, the System User can input his/her username and password for being credited with a comment.

Again referring to FIG. 7, the System User can create audio or video content for an event. To create audio content, the System User would click on "record audio presentation" in 701. Alternatively, the System User could click a similar link (not shown), entitled "record video presentation," to record both audio and video. Clicking on a link, such as the "record video presentation," would cause the System User's microphone and web camera to transmit the audio and video to the events.com central server where it is stored and associated to a particular event.

The event widget of the present invention also supports providing a dynamic or changing event information based on System User location. As such, when a System User has a mobile device with location determining capabilities, such as GPS, the System User can opt to have their geographic location transmitted occasionally to the event widget, which can immediately update the list of events by sorting by distance from the System User. JavaScript, according to the present invention, includes functionality that can be called to fetch System User location information, which is then transmitted back to the events.com central server for processing. This will be described in detail referring to FIG. 11.

Figure 11:
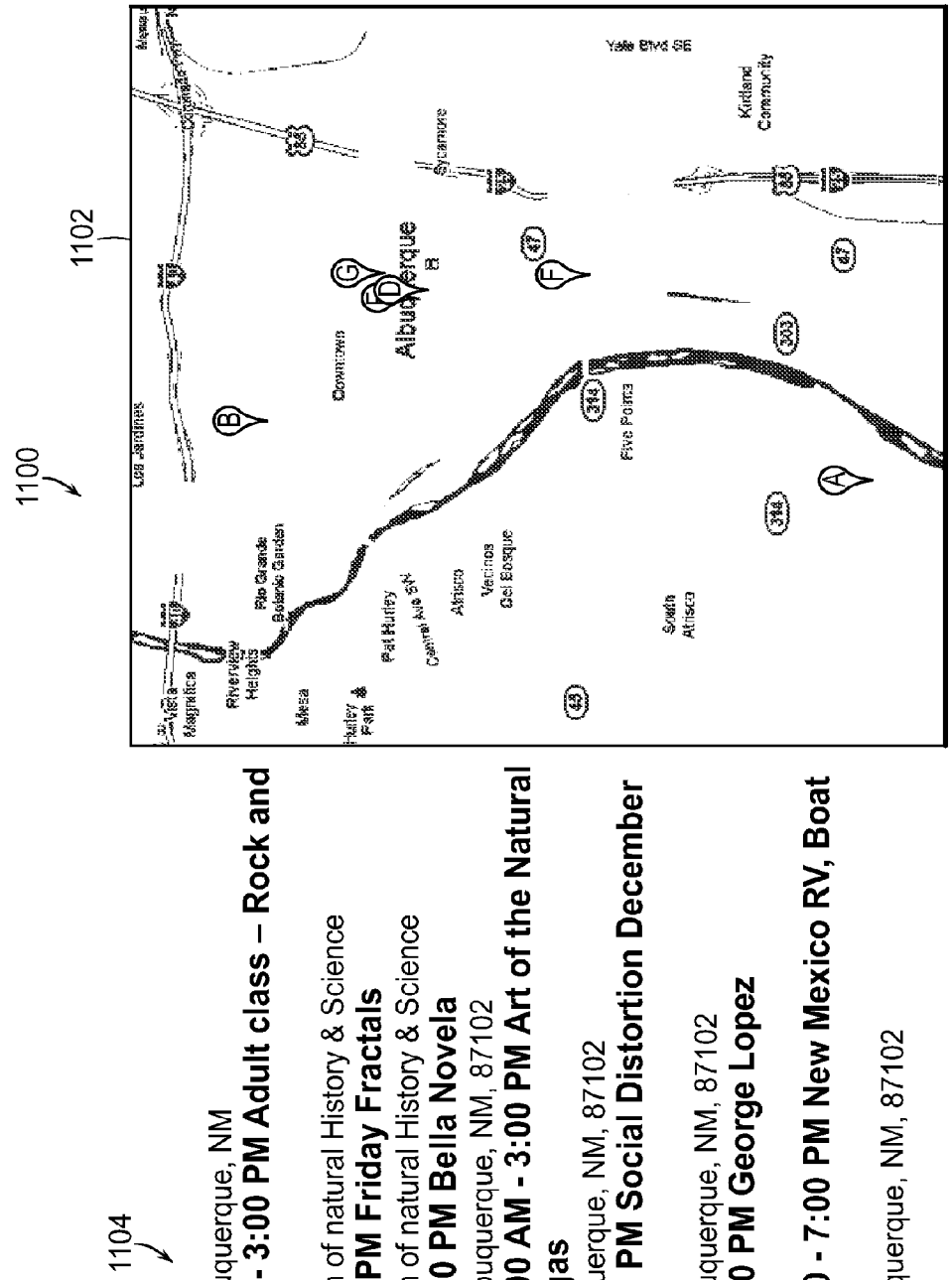
FIG. 11 shows a representative screen display for a System User showing a map and event descriptions for events near the System User.

Referring to FIG. 11, generally at 1100, when the present invention is being operated in that mode, the event widget can cause the generation of a map display as shown at 1100, which has event locations posted on it. The posted events are briefly described next to the map as shown as searches 1104. As the System User location changes, the map and listed events also will change.

The system of the present invention generates revenue through ticket sales. When System Users directly enter event information into the database at events.com for selling tickets, this will permit the system to sell tickets for them. System Users may manually enter an event using the Add Event interface is shown in FIG. 12, generally at 1200.

Referring to FIG. 12 at 1202, an alternative method is provided for submitting the event, for example, if it is posted as an URL. All that is needed is submit the URL to the events.com database for searching. If this method is not available, then the complete event information must be provided, as will be described.

At 1204, the System User provides specific information about the event including predefined tags. At 1206, the System User provides a description of the event. At 1208, the System User provides any related pictures. At 1210, the System User provides ticket selling information and at 1212, the System User provides information if he/she does not want it posted anonymously. Once this information is provided, the new event is added to the events.com database for searching.

For providing the ticket sale service for System User, the system charges a percentage of the sales value. From this percentage, the system pays commissions to any website or audio/video presenter that helped procure the ticket sale.

Again, referring to FIG. 6 at 610, a System User can buy tickets for events by clicking the "buy tickets" button below the event. If, however, the System User wants more information before buying tickets, he/she can click on the event and be presented with the screen display shown in FIG. 7. After reviewing the information and listening to the audio presentations, the System User can click the "buy tickets" button in 701 to buy tickets for the event.

Clicking the "buy tickets" button will cause the system to produce interface 1300 in FIG. 13. At 1302, the purchaser will enter purchase information. After the "Buy Tickets" button in 1302 is clicked, an acknowledgment of the purchase will be shown at 1304 to confirm the purchase is complete.

If the System User listened to an audio presentation of the event, or used the event widget on a particular website in buying the tickets, then, based on their IP address or their HTTP cookies, the system can determine which audio announcer and which website were responsible for the ticket purchase and award the appropriate commissions. The payment of commissions may be based on the method described in U.S. patent application Ser. No. 12/637,216 that is also owned by the owner of the present application, which is incorporated herein by reference.

The method described of the present invention includes the additional feature of the capability to data mine the search results on a search results page for events. That is, the search engine is capable of data mining for events from each web page that is referenced in the list of search results using the methods employed by the event widget for data mining events. The data mined events are then formatted and presented on the search results page in a special event-related format associated with the appropriate search result page. This will be described in greater detail referring to FIG. 14.

FIG. 14, generally at 1400, shows the additional feature with regard to a search for "Lady Gaga Tickets." One of the first results, such as the one for "livenation.com," has its results data mined according to the present invention. This will produce the event information at 1404, which is "Lady Gaga, Star Stadium, Houston, Tex., July 19$^{th}$ @ 7 pm." This event information is posted, in this case, beneath the search result summary for livenation.com; however, other locations may be used and still be within the scope of the present invention. In this way, the System User would have event-specific information that would allow him/her to more quickly decide if that is a page he/she wants to visit.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present invention is not intended to be limited to the embodiments shown or described herein.

The invention claimed is:

1. A computer-implemented system for presenting event content to a system user on a display screen in a standalone event widget embedded in a third-party website displayed on the display screen, comprising:

at least one computer-based system user event content (SUEC) device in electronic communications with at least a central network on which web-based searches are capable of being conducted and an event system that is capable of storing event content that is capable of being searched using a set of search parameters to retrieve event content based on the search parameters, with the at least one SUEC device including at least a programmable processor, storage medium, display screen, and input subsystem;

the event system in electronic communications with the SUEC device having at least an event central system server, system accounting server, and a system search engine, the event central system server being in electronic communications with the SUEC device, system accounting server, and system search engine, with the event central system server receiving a request from the SUEC device for associating a set of search parameters with a webmaster that controls web-based content downloaded from the central network by the system user to the SUEC, and transmitting the set of search parameters based on the association of the set of search parameters with the webmaster to the system search engine for searching for event content based on such set of search parameters, and transmitting search results to the SUEC device for display on a portion of the SUEC device display screen, the system accounting server in electronic communications with the event central system server for processing the request from the SUEC device to associate the set of search parameters of the webmaster that controls web-based content downloaded from the web server and associating the set of search parameters with the webmaster and transmitting the associated set of search parameters to the event central system server, the system search engine including an event database storing event information that is selectable using search parameters of the set of search parameters of the webmaster, with the system search engine receiving the set of search parameters from the event central system server and searching the events database for event content that matches search parameters of the set of search parameters, including at least a date search parameter, and transmitting search results based on the set of search parameters to the central server, and the standalone event widget embedded in at least one third-party website that displays at least the event content results that match the search parameters of the set of search parameters.

2. The system as recited in claim 1, wherein the central network includes the Internet.

3. The system as recited in claim 1, wherein the set of search parameters include parameters to search for events data mined from a predetermined set of websites.

4. The system as recited in claim 1, wherein the set of search parameters include parameters to search for events matching a predetermined set of keywords or tags, with the matching including matching the keywords or tags to an event description, event title, event tag, or event category of event content stored in the event database.

5. The system as recited in claim 1, wherein the set of search parameters include a parameter to display search results with priority to a particular webmaster.

6. The system as recited in claim 1, wherein the system search engine includes searching event titles, event descriptions, or event dates for inclusion in search results.

7. The system as recited in claim 1, wherein the event system further includes a system submission server for receiving event information from system users that can be associated with event content stored in the event database, with such event information being searchable as a search parameter.

8. The system as recited in claim 7, wherein the event system further includes a system ticket server for system users to sell tickets to events with event content in the event database.

9. The system as recited in claim 8, wherein the system ticket server determines commissions from ticket sales for payment to websites downloaded by the ticket purchaser and system users that created event information listened to, or viewed by, the ticket purchaser according to tracking information stored in the system ticket server.

10. The system as recited in claim 7, wherein event information includes audio presentation information or video presentation information.

11. The system as recited in claim 1, wherein the search results include search results within the predetermined distance from a system user location.

12. The system as recited in claim 11, wherein the search results within the predetermined distance from a system user location change as the system user location changes.

13. A computer-implemented system for presenting event content to a system user on a display screen in a standalone event widget embedded in a third-party website displayed on the display screen, comprising:

at least one computer-based system user event content (SUEC) device in electronic communications with at least a central network on which web-based searches are capable of being conducted and an event system that is capable of storing event content that is capable of being searched using a set of search parameters to retrieve event content based on the search parameters, with the at least one SUEC device including at least a programmable processor, storage medium, display screen, and input subsystem;

the event system in electronic communications with the SUEC device and the central network, with the event system having at least an event central system server, system accounting server, and a system search engine, the event central system server being in electronic communications with the SUEC device, system accounting server, and system search engine, with the event central system server receiving a request from the SUEC device for associating a set of search parameters with a webmaster that controls web-based content downloaded from the central network by the system user to the SUEC, and transmitting the set of search parameters based on the association of the set of search parameters with the webmaster to the system search engine for searching for event content based on such set of search parameters, and transmitting search results to the SUEC device for display on a portion of the SUEC device display screen, the system accounting server in electronic communications with the event central system server for processing the request from the SUEC device to associate the set of search parameters of the webmaster that controls web-based content in the form of a web page downloaded from the web server, and through the event central system server downloading the web page downloaded by the SUEC and associating the set of search parameters with the webmaster based on content in the web page downloaded from the central network, and transmitting the associated set of search parameters to the event central system server, the system search engine including an event database storing event information that is selectable by predetermined search parameters set by at least webmasters, with the system search engine receiving the set of search parameters from the event central server and searching the events database for event content that matches search parameters of the set of search parameters, including at least a date search parameter, and transmitting search results based on the set of search parameters to the central server, and the standalone event widget embedded in at least one third-party website that displays at least the event content results that match the search parameters of the set of search parameters.

14. The system as recited in claim 13, wherein the central network includes the Internet.

15. The system as recited in claim 13, wherein the set of search parameters include parameters to search for events data mined from a predetermined set of websites.

16. The system as recited in claim 13, wherein the set of search parameters include parameters to search for events matching a predetermined set of keywords or tags, with the matching including matching the keywords or tags to an event description, event title, event tag, or event category of event content stored in the event database.

17. The system as recited in claim 13, wherein the set of search parameters include a parameter to display search results with priority to a particular webmaster.

18. The system as recited in claim 13, wherein the system search engine includes searching event titles, event descriptions, or event dates for inclusion in search results.

19. The system as recited in claim 13, wherein the event system further includes a system submission server for receiving event information from system users that can be associated with event content stored in the event database, with such event information being searchable as a search parameter.

20. The system as recited in claim 19, wherein the event system further includes a system ticket server for system users to sell tickets to events with event content in the event database.

21. The system as recited in claim 20, wherein the system ticket server determines commissions from ticket sales for payment to websites downloaded by the ticket purchaser and system users that created event information listened to, or viewed by, the ticket purchaser according to tracking information stored in the system ticket server.

22. The system as recited in claim 19, wherein event information includes audio presentation information or video presentation information.

23. The system as recited in claim 13, wherein the search results include search results within a predetermined distance from a system user location.

24. The system as recited in claim 23, wherein the search results within the predetermined distance from a system user location change as the system user location changes.

* * * * *